(12) United States Patent
Baba (10) Patent No.: US 12,099,717 B2
(45) Date of Patent: Sep. 24, 2024

(54) INFORMATION AND PROCESSING DISPLAY DEVICE WITH ONE OR MORE DIVIDED REGIONS

(71) Applicant: Faurecia Clarion Electronics Co., Ltd., Saitama (JP)

(72) Inventor: Naoya Baba, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/138,169

(22) Filed: Apr. 24, 2023

(65) Prior Publication Data

US 2023/0409190 A1 Dec. 21, 2023

(30) Foreign Application Priority Data

Jun. 15, 2022 (JP) .................... 2022-096862

(51) Int. Cl.
| | |
|---|---|
| *G06F 3/04886* | (2022.01) |
| *B60K 35/00* | (2006.01) |
| *G06F 3/04845* | (2022.01) |
| *B60K 35/28* | (2024.01) |
| *B60K 35/29* | (2024.01) |

(52) U.S. Cl.
CPC .......... *G06F 3/04886* (2013.01); *B60K 35/00* (2013.01); *G06F 3/04845* (2013.01); *B60K 35/28* (2024.01); *B60K 35/29* (2024.01); *B60K 2360/166* (2024.01); *B60K 2360/18* (2024.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 2002/0039385 A1* | 4/2002 | Okada | ...................... | H04N 5/45 375/E7.145 |
| 2009/0298545 A1* | 12/2009 | Kittel | ...................... | G09G 5/14 455/566 |
| 2010/0117810 A1* | 5/2010 | Hagiwara | ............. | G06F 3/0483 340/425.5 |

(Continued)

FOREIGN PATENT DOCUMENTS

JP 2020173685 A 10/2020

*Primary Examiner* — Rinna Yi (74) *Attorney, Agent, or Firm* — REISING ETHINGTON P.C.

(57) ABSTRACT

An information processing and display device may include a display device, an input unit that accepts user operations, and a processing unit that performs processing related to a plurality of functions according to a program stored in a storage unit. The processing unit sets a plurality of divided regions on the display and can change demarcation of these set divided regions according to a user operation. When executing a process of generating display data related to the plurality of functions by dividing the information display related to the plurality of functions into a plurality of divided regions, the processing unit prioritizes execution of a process related to a function for which information is displayed in a divided region set to be the largest among the plurality of functions over processes related to other functions.

11 Claims, 5 Drawing Sheets

(56) References Cited

U.S. PATENT DOCUMENTS

| | | | |
|---|---|---|---|
| 2012/0249791 A1* | 10/2012 | Shen | B60R 1/00 |
| | | | 348/148 |
| 2013/0304308 A1* | 11/2013 | Maruyama | G06F 17/00 |
| | | | 701/31.4 |
| 2017/0336627 A1* | 11/2017 | Ieda | G01C 21/36 |
| 2020/0326850 A1 | 10/2020 | Ezaki | |

* cited by examiner

INFORMATION AND PROCESSING DISPLAY DEVICE WITH ONE OR MORE DIVIDED REGIONS

CROSS REFERENCE TO RELATED APPLICATION

This patent application claims the benefit and priority of Japanese Patent Application No. 2022-096862, filed on Jun. 15, 2022, the disclosure of which is incorporated by reference herein in its entirety as part of the present application.

FIELD

The present invention relates to an information processing and display device.

BACKGROUND

Conventionally, there has been technology for splitting a display screen into a plurality of display regions and allocating display related to different functions to each display region.

For example, Patent Document 1 (US 2020/0326850 A1) describes as follows. "[0081] When the display screen of the first display 21 is divided into a plurality of display regions 211, a pointer 212 is displayed on the display screen. When a user touches on and drags the pointer 212, a display region setting unit 123 dynamically changes a size of each of the display regions 211 on the display screen. Further, when a user touches off the pointer 212, the display region setting unit 123 confirms the size of each of the display regions 211". "[0080] For example, the navigation screen, the air-conditioning screen, the audio screen, the radio screen, the application screen, the telephone screen, or the like can be allocated to each of the display regions 211".

SUMMARY

In a system in which a screen is divided into a plurality of regions and a plurality of functions are allocated thereto, execution of the plurality of functions and screen display are processed in parallel. For this reason, the processing load increases, and a delay may occur in execution of the function and update of the display screen. When a delay occurs in a function to which the user is focused, there is a possibility that the convenience of the user is impaired. In particular, in an on-vehicle apparatus, from the perspective of the performance of the installed processing device, sufficient speed for executing functions and updating the display is difficult and delays in updating information a user is focused on may lead to delays in decision, and avoiding delays in information update for information the user is focused on can be a problem.

Therefore, an object of the present application is to reduce the influence of delay in the case where a plurality of displays are displayed simultaneously.

In order to achieve the object described above, an information processing and display device may include a display, an input unit that accepts user operations, and a processing unit that performs processing related to a plurality of functions according to a program stored in the storage unit. The processing unit sets a plurality of divided regions on the display and can change demarcation of these set plurality of divided regions according to user operation. When executing a process of generating display data for displaying information related to the plurality of functions on the display device by dividing the information display related to the plurality of functions into the plurality of divided regions, the processing unit prioritizes execution of a process related to a function for which information is displayed in a divided region set to be largest among the plurality of functions over processes related to other functions.

According to the present application, the delay effect of simultaneously displaying a plurality of displays can be reduced. Problems, configurations, and effects other than those described above will become apparent from the following description of embodiments.

DESCRIPTION

Hereinafter, embodiments will be described with reference to the drawings.

Embodiment 1

Figure 1:
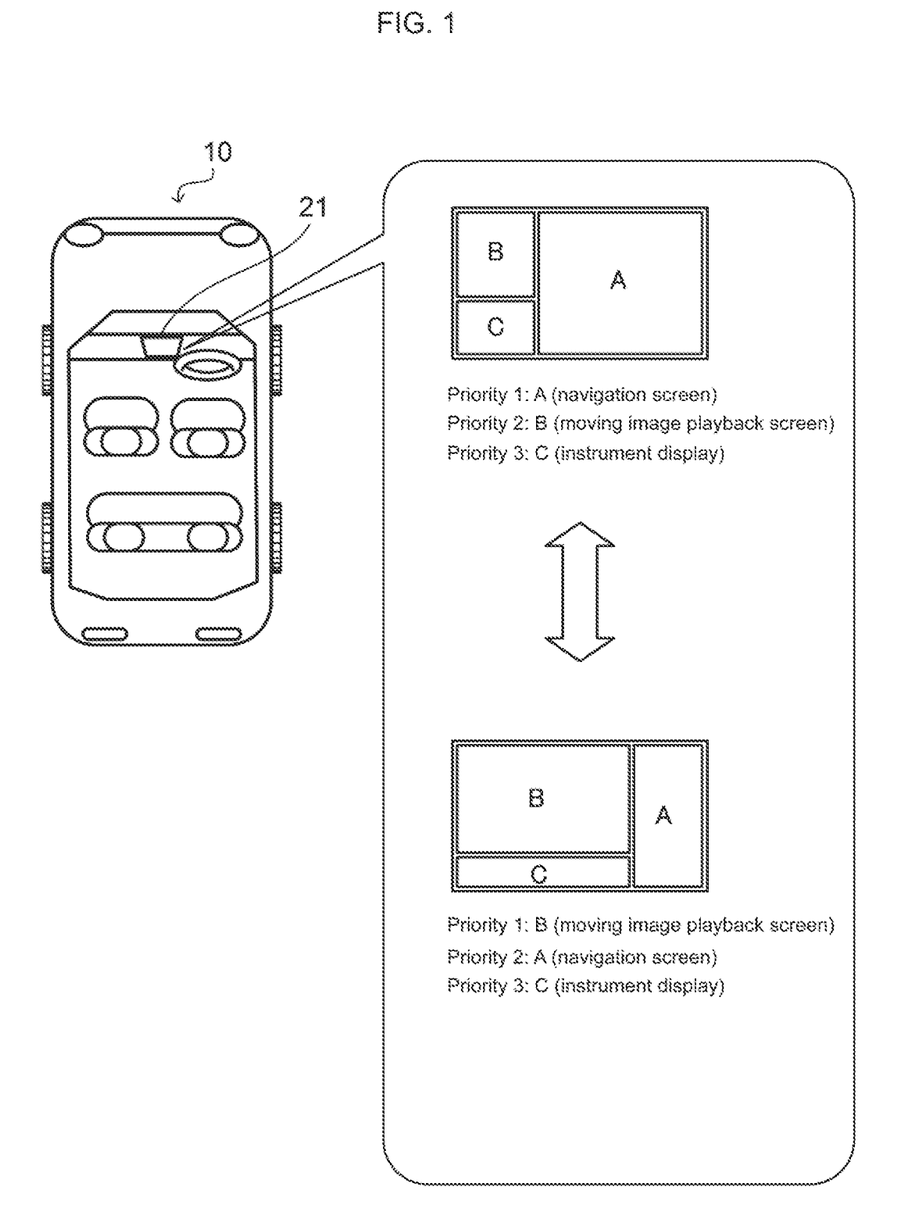
FIG. 1 is an explanatory diagram of an information processing and display screen according to Embodiment 1.

FIG. 1 is an explanatory diagram of an information processing and display screen according to Embodiment 1. The information processing and display device according to Embodiment 1 is mounted on a vehicle 10 and includes a touch panel display 21. The touch panel display 21 is an input/output unit in which a display device and a touch panel serving as an input unit are combined.

A plurality of divided regions can be set in the display region of the touch panel display 21. The size of the respective divided regions can be changed by means of user operation. Information display screens of different functions are allocated to the respective divided regions.

In the example of FIG. 1, a divided region A, a divided region B, and a divided region C are arranged in the display region of the touch panel display 21.

A navigation screen is displayed in the divided region A. The navigation screen is a screen for displaying display data generated by the navigation function. For example, a map, current location, surrounding buildings, and the like are displayed on the navigation screen and are appropriately updated.

In the divided region B, a moving image playback screen is displayed. The moving image playback screen is a screen that displays display data generated by the contents provider function. The display data from the contents provider function includes information display related to playback of television video, music data, and the like in addition to moving image video by playback of moving image data. These display data are updated as appropriate.

An instrument screen is displayed in the divided region C. The instrument display is a display that supplementarily indicates the vehicle speed, engine revs (RPM), water temperature, the amount of fuel remaining, and the like, and is generated by the instrument panel function. These displays are updated as appropriate.

The information processing and display device according to the Embodiment 1 performs display of the divided regions A to C in parallel. Therefore, the information processing and display device executes processes of three functions (navigation function, contents provider function, and instrument panel function) in parallel. Here, the information processing and display device prioritizes execution of processing related to a function whose information is displayed in the divided region set to be the largest over processing related to other functions. For example, if the sizes of the divided regions are in the order of the divided region A, the divided region B, and the divided region C, the divided region A is set to the highest priority level 1, the divided region B is set to the second highest priority level 2, and the divided region C is set to the priority level 3.

Thereafter, if the boundaries of the divided regions are moved based on user operation and the sizes thereof are changed such that size is in the order of the divided region B, the divided region A, and the divided region C, the divided region B is set to the highest priority level 1, the divided region A is set to the second highest priority level 2, and the divided region C is set to the priority level 3.

For example, the information processing and display device sets the update frequency of the display screen information in descending order of priority. As an example, the information processing and display device updates the divided region with priority 1 every 100 ms, updates the divided region with priority 2 every 500 ms, and updates the divided region with priority 3 every 1000 ms. For example, the information processing and display device may set the processing share of the CPU for processes for each function that performs display on the divided screen in descending order of priority.

The information processing and display device can also control the order of execution of the functions according to the priority. As an example, the information processing and display device may preferentially execute the function assigned to the divided region with priority 1, and then preferentially execute the function assigned to the divided region with priority 2. In other words, "prioritizing processing related to functions displaying information in the divided region set as largest" may mean a priority in resource allocation between concurrent display processes or it may mean a priority in processing order in the function itself.

Since the size of each divided region is set based on operation by the user themselves, there is a high possibility that the divided region set to the largest size is the area to which the user pays most attention at that time. In particular, in the case of an on-vehicle apparatus, a user often checks display contents in a short time in order to obtain desired information while directly viewing the surroundings of the vehicle and performing a driving operation or the like. For this reason, it can be anticipated that the divided region set to be large by the user displays information which is of high importance to the user and is highly likely to be focused on. Thus, the information processing and display device prioritizes the divided region set to be the largest over the other divided regions. Thus, even when performing function execution and display update at a sufficient speed is difficult, this avoids delay in information updates for information that the user is focused on.

Figure 2:
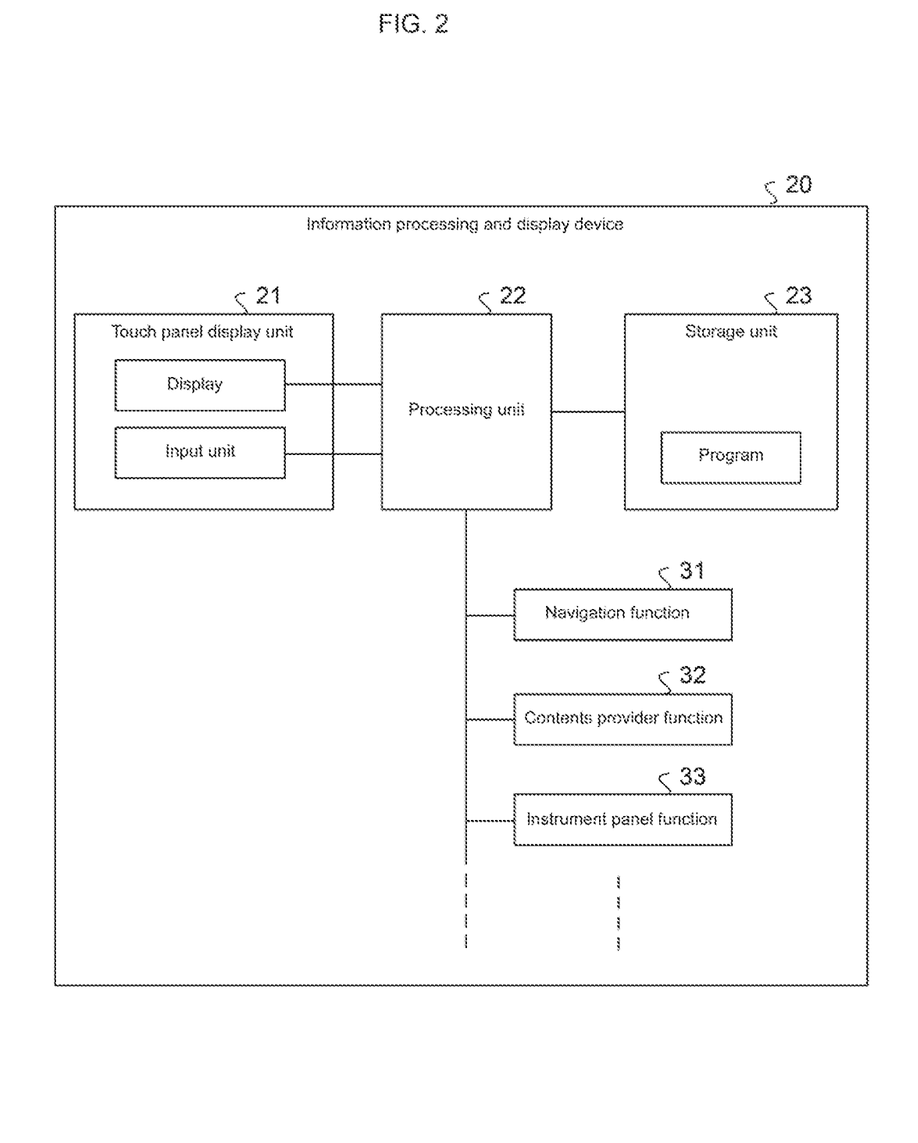
FIG. 2 is a configuration diagram illustrating a configuration of an information processing and display device.

FIG. 2 is a configuration diagram illustrating a configuration of an information processing and display device. The information processing and display device 20 includes a touch panel display 21, a processing unit 22, and a storage unit 23. The information processing and display device includes functional units such as a navigation function unit 31, a contents provider function unit 32, and an instrument panel function unit 33.

The navigation function unit 31 indicates the position of the vehicle, provides map information, sets and provides guidance on a route, and provides peripheral building and road traffic information.

The contents provider function unit 32 performs playback of moving image data, playback of music data, reception of television or radio, and the like.

The instrument panel function unit 33 is a functional unit that acquires information such as the speed, RPM, water temperature, and remaining amount of fuel from the vehicle 10 and display and output of the information. Note that the illustrated functional units are merely examples, and any functional units such as a vehicle surroundings monitoring function and a parking assist function can be provided.

The touch panel display unit 21 is an input/output unit in which a display and a touch panel serving as an input unit for receiving user operation are combined. User operation includes an operation of changing the size of the divided regions to be allocated to the plurality of functions.

The storage unit 23 is a hard disk drive, a solid-state drive, or the like, and stores a program that implements processing related to functions such as the navigation function 31. The storage unit 23 can also be used to store map data, moving image data, music data, and the like.

The processing unit 22 is, for example, a central processing unit (CPU), and performs processing related to a plurality of functions in accordance with a program stored in the storage unit 23.

The processing unit 22 sets a plurality of divided regions on a display device and can change demarcation of the plurality of set divided regions according to a user operation.

The processing unit 22 generates display data for displaying information display related to a plurality of functions on a display device by dividing the display device into a plurality of divided regions. Here, the processing unit 22 prioritizes execution of processing related to the function for which information is displayed in the divided region set to be the largest among the plurality of functions over processing related to the other functions.

For example, the processing unit 22 sets a priority to each of the plurality of divided regions in accordance with the order of the size thereof. Here, the processing unit 22 performs the processing related to the plurality of functions in accordance with the priority set to the divided region in which the information related to the function is displayed. As an example, the processing unit 22 sets the information update frequency related to the function for which information is displayed in the divided region set to be the largest among the plurality of functions to be higher than the information update frequencies related to the other functions. In a case where the processing unit 22 is composed of a CPU, the CPU executes a prescribed program to set a priority to each of the plurality of divided regions in accordance with the order of size. The program assigns processing share of the CPU of each process related to a plurality of functions in accordance with priority set to the divided region where information related to the function is displayed. Here, the CPU is controlled so that the processing share of the processing related to the function among the plurality of functions for which information is displayed in the divided region set to be the largest is set larger than the processing share of the processing related to the other functions.

Figure 3:
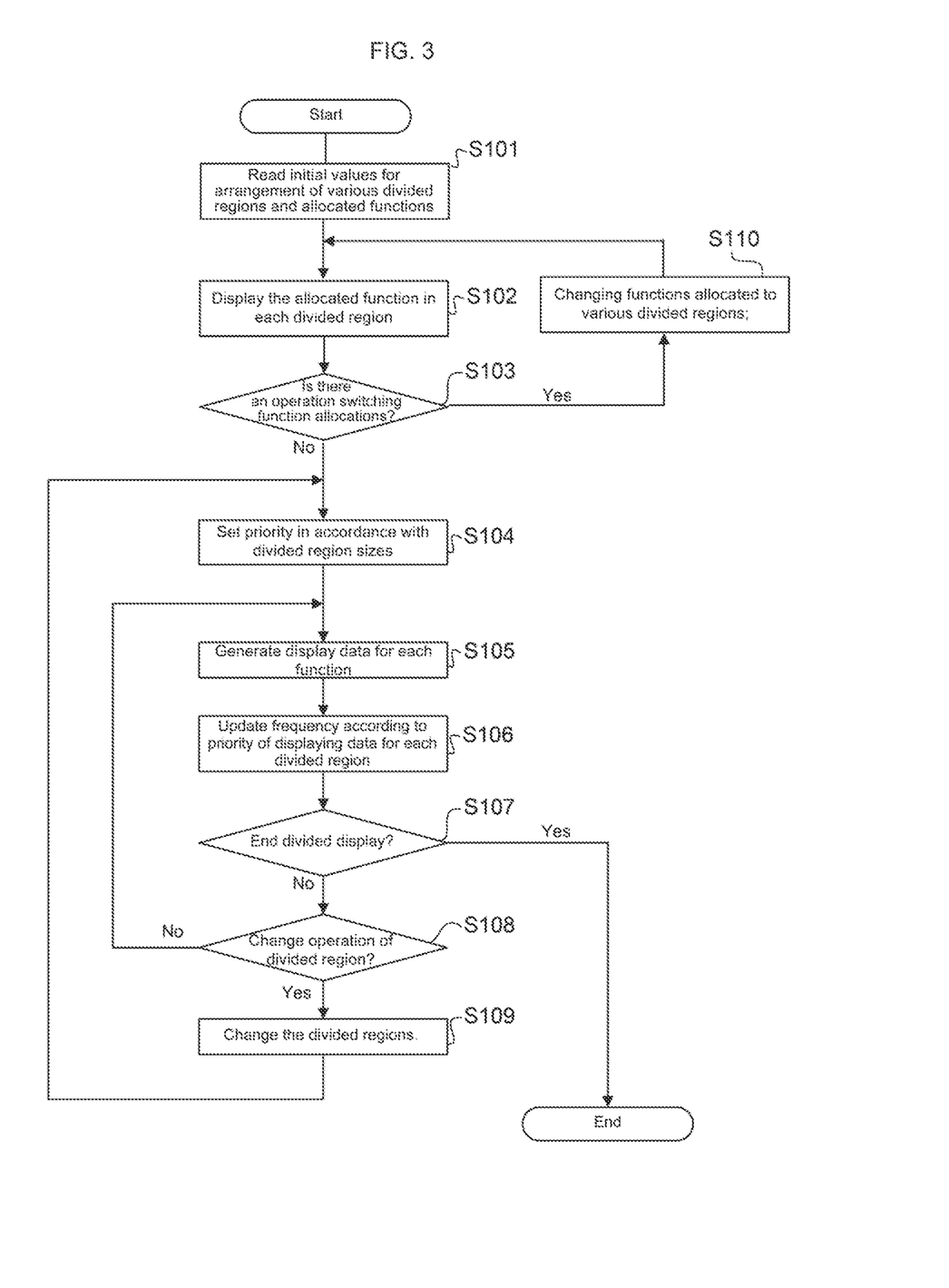
FIG. 3 is a flowchart illustrating a processing procedure of the divided display by an information processing and display device.

FIG. 3 is a flowchart illustrating a processing procedure of the divided display by an information processing and display device 20. First, the processing unit 22 reads the arrangement of the divided regions and the initial values of the functions to be allocated thereto from the storage device 23 (step S101). This initial value is a value set in advance in the device at the time of the first activation, and is a value storing the state set by the user at the time of the previous activation for the second or subsequent activation. Based on the initial value thus read, the processing unit 22 performs display related to the function allocated to each divided region in each divided region on the touch panel display 21 (step S102). The functions allocated to each divided region can be replaced based on replacement operation by the user such as drag and drop on the touch panel display unit 21. When such a replacement operation is performed (Yes in step S103), the processing unit 22 changes the function allocated to each divided region based on the replacement operation. That is, the processing unit 22 updates the initial value (step S110), and returns to step S102.

When the replacement operation is not performed (No in step S103), the processing unit 22 sets the priority according to the size of the divided region (step S104). Further, the processing unit 22 generates the display data of each function (step S105), and updates the display data of each divided region at a frequency corresponding to the priority (step S106).

After step S106, the processing unit 22 determines whether or not the ending condition of the divided display is satisfied (step S107). Here, "receipt of operation requesting ending divided display from the user," "interrupt of display using the entire screen," and "turning the power supply for the information processing and display device OFF" can be used as the end condition of the divided display. If the end condition for the divided display is satisfied (Yes in step S107), the processing unit 22 ends processing for divided display.

When the end condition for the divided display is not satisfied (No in step S107), the processing unit 22 determines whether or not a change operation for changing the size of the divided region has been received (step S108). If a change operation is not received (No in step S108), processing returns to step S105. If a change operation is received (Yes in step S108), the processing unit 22 changes the size of the divided region (step S109) and repeats processing from step S104.

Embodiment 2

Figure 4:
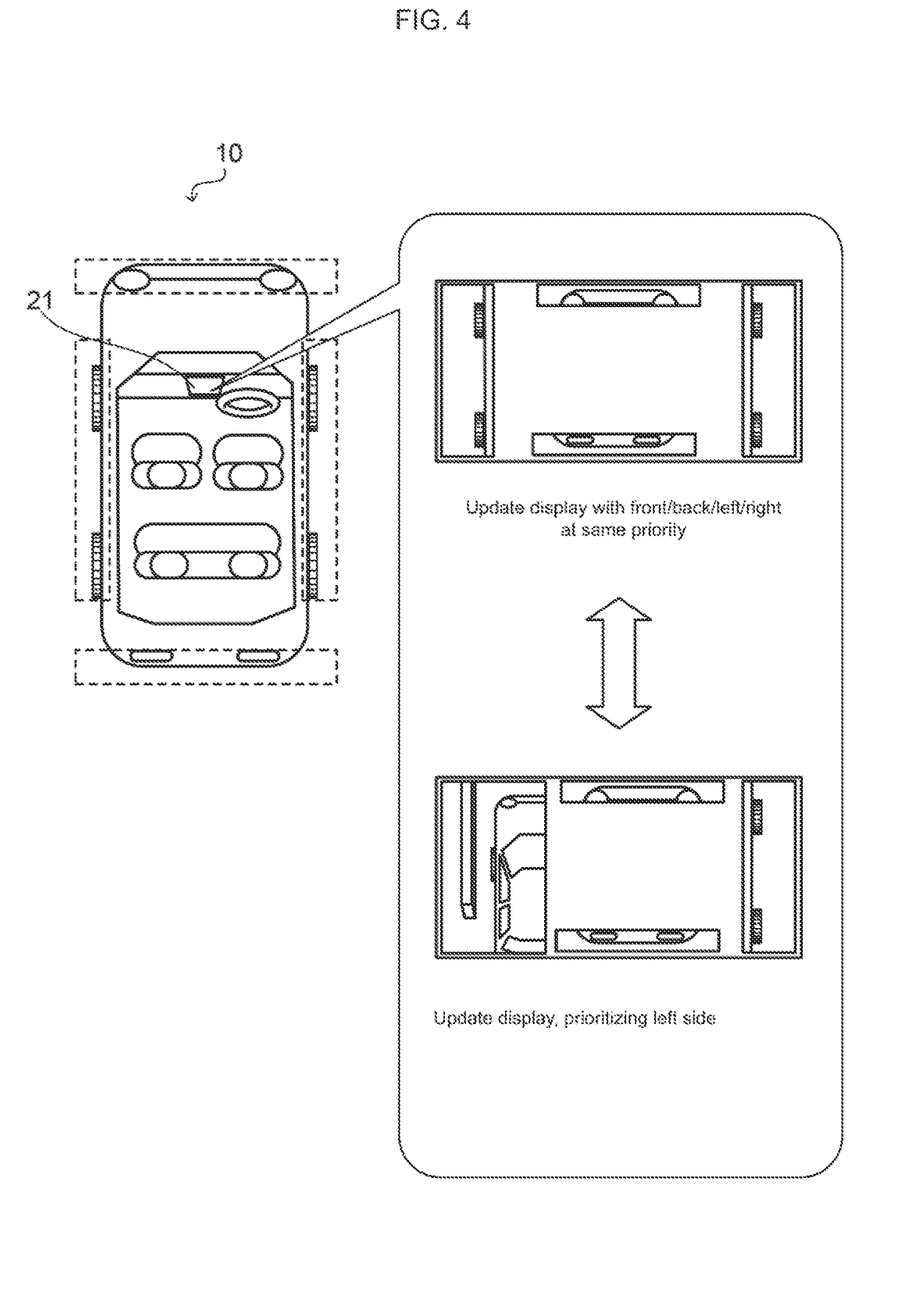
FIG. 4 is an explanatory diagram of an information processing and display screen according to Embodiment 2.

FIG. 4 is an explanatory diagram of an information processing and display screen according to Embodiment 2. Similar to Embodiment 1, the information processing and display device of the Embodiment 2 is mounted in the vehicle 10 and includes the touch panel display unit 21. Otherwise, the configuration is the same as that for the information processing and display device 20 described in Embodiment 1, and thus will be described using the codes indicated in Embodiment 1.

The information processing and display device 20 according to Embodiment 2 has a surroundings monitoring function of acquiring images in a plurality of directions around the vehicle from a camera on the outside of the vehicle and displaying the images. The surroundings monitoring function includes, for example, a forward capturing and displaying function, a rearward capturing and displaying function, a left side capturing and displaying function, and a right side capturing and displaying function.

In FIG. 4, the information processing and display device captures images of the vicinity of the front bumper, the vicinity of the rear bumper, the left side of the vehicle body, and the right side of the vehicle body of the vehicle 10 with cameras. The information processing and display device 20 generates divided regions on the upper, lower, left, and right sides of the touch panel display unit 21, and displays the resulting captured images corresponding to the front, rear, left, and right sides of the vehicle 10. Furthermore, when a user operation for selecting any one of the divided regions is received, the information processing and display device enlarges and displays the selected divided region.

When any one of the divided regions is enlarged, the information processing and display device 20 prioritizes processing related to this divided region over processing related to the other divided regions. For example, if none of the divided regions are selected, the divided regions corresponding to the front, rear, left, and right sides are set to have the same priority, and the display is updated at the same frequency. In this state, if an operation of selecting the divided region corresponding to the left side of the vehicle 10 is received, the processing unit 22 enlarges the divided region therefore and updates the display at a higher frequency than the regions for the other parts. Note that priority may be given not only to update the display, but also for generation processing of an image to be displayed.

In this manner, by giving priority to the region for the part enlarged by the user, even when updating images in all directions at a high frequency is difficult, delay in information update for information on which the user is focused can be avoided.

Figure 5:
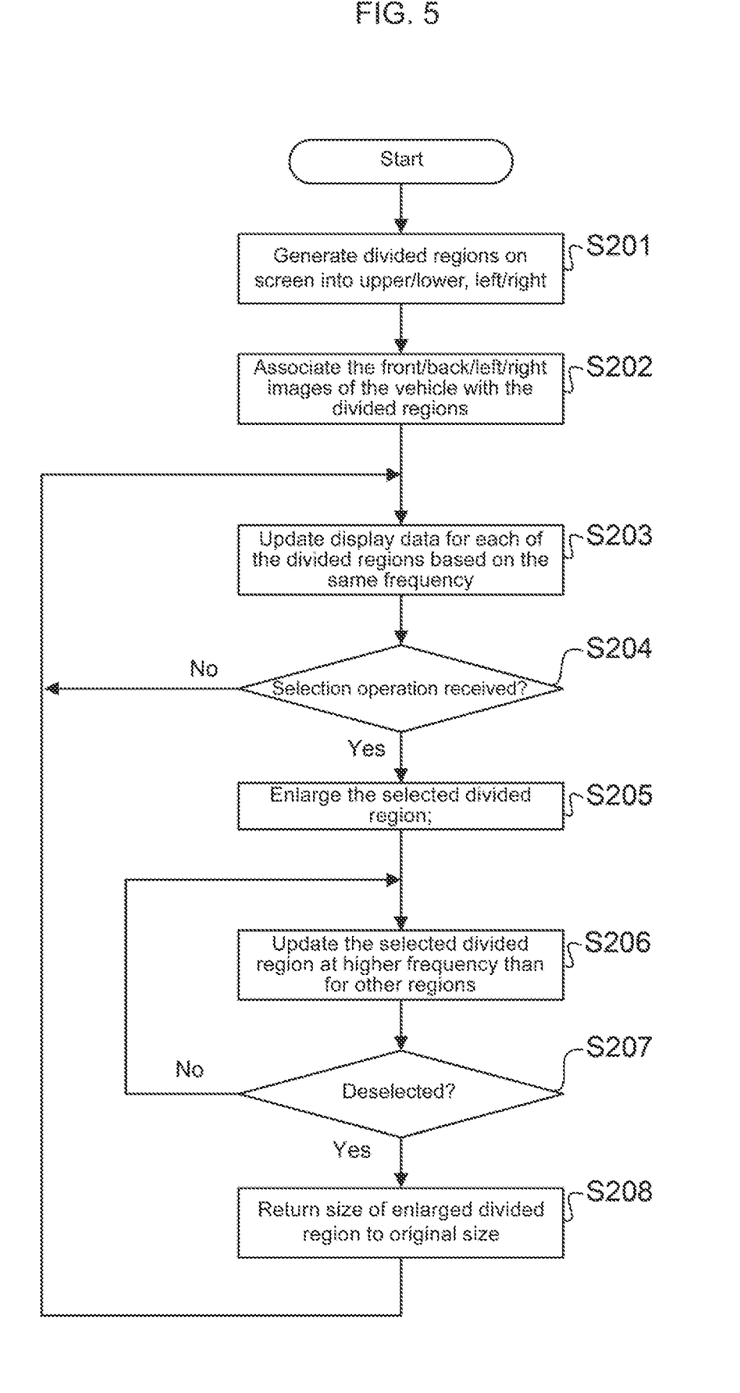
FIG. 5 is a flowchart illustrating a processing procedure of the surroundings monitoring by the information processing and display device.

FIG. 5 is a flowchart illustrating a processing procedure of the surroundings monitoring by the information processing and display device 20. This processing flow starts when a request for surroundings monitoring is received from a user. In addition, while not shown in FIG. 5, this processing flow is terminated when a termination condition of the surroundings monitoring is satisfied.

When the surroundings monitoring is started, the processing unit 22 generates divided regions on the upper, lower, left, and right sides of the screen (step S201), and displays the associated front, rear, left, and right images of the vehicle 10 on the divided regions on the upper, lower, left, and right sides (step S202).

The processing unit 22 updates the display data of each divided region at the same frequency (step S203), and determines whether or not a selection operation of any divided region is received from the user (step S204). When a selection operation is not received (No in step S204), the process returns to step S203.

If the processing unit 22 receives a selection operation of any divided region (Yes in step S204), the processing unit 22 enlarges and displays the divided region that was selected (step S205). The processing unit 22 updates the selected divided region at a higher frequency than the other divided regions (step S206), and determines whether or not a selection cancellation operation has been received (step S207).

If a selection cancellation operation is not received (No in step S207), the processing unit 22 returns to step S206. If the selection cancellation operation is received (Yes in step S207), the processing unit 22 returns the enlarged divided region to the original size (step S208) and returns to step S203.

As described above, the disclosed information processing and display device 20 includes a display device, an input unit that accepts user operations, and a processing unit 22 that performs processing related to a plurality of functions according to a program stored in a storage unit 23. The processing unit 22 sets a plurality of divided regions on the display device, enables the division of the plurality of divided regions to be changed by user operation, generates display data for dividing the information to be displayed according to the plurality of functions among the plurality of divided regions and displaying on the display device, and prioritizes execution of processing related to, of the plurality of functions, the function for which information is displayed in the divided region set as largest over processing related to other functions. Thus, delay of information update for the information to which the user is focused on can be avoided and the effect of the delay when a plurality of displays are simultaneously performed can be reduced.

The processing unit sets priority to each of the plurality of divided regions in order of size, and performs processing related to the plurality of functions in accordance with the priority set to the divided region in which information related to the function is displayed. For this reason, it is possible to estimate information that is highly likely to be focused on by the user based on user operation and prioritize display of this information.

The processing unit sets the information update frequency related to the function for which information is displayed in the divided region set to be the largest among the plurality of functions to be higher than the information update frequencies related to the other functions. With this manner of operation, real-time performance for information that is highly likely to be focused on by the user can be ensured.

The disclosed information processing and display device 20 is mounted in a vehicle 10, the plurality of functions include at least one of a navigation function, a contents provider function, and an instrument panel function, and user operation includes an operation of changing the size of divided regions allocated to the plurality of functions. According to such a configuration and operation, the information processing and display device 20 can avoid a delay with respect to a request to increase display size by the user.

The disclosed information processing and display device 20 is mounted in a vehicle 10, and the plurality of functions include a function of acquiring and displaying images in a plurality of directions surrounding the vehicle, and the processing unit 22 allocates the plurality of divided regions to the plurality of directions, enlarges a corresponding divided region when a user operation for requesting enlargement of the divided region in any of the plurality of directions is received, and prioritizes processing related to display in this divided region over processing related to display in other divided regions. According to such a configuration and operation, the information processing and display device 20 can avoid delay in displaying the direction specified by the user out of the images of the plurality of directions simultaneously displayed.

Note that the present invention is not limited to the embodiments described above and includes various modifications. For example, the embodiments described above have been described in detail in order to describe the present invention in an easy-to-understand manner, and the present invention is not necessarily limited to a configuration including the entirety of the configurations described. In addition to the deletion of such a configuration, replacement or addition of a configuration is also possible.

In the Embodiment described above, the information processing and display device 20 mounted on the vehicle 10 is described as an example, but the present invention is not limited to an on-vehicle apparatus. For example, the present invention can be applied to a configuration in which video images of a plurality of monitoring cameras in a building are displayed in a divided manner and an image of a monitoring camera selected by a user is enlarged.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

EXPLANATIONS OF REFERENCE SYMBOLS

10: Vehicle, 20: Information processing and display device, 21: Touch panel display, 22: Processing unit, 23: Storage unit, 31: Navigation function unit, 32: Contents provider function unit, and 33: Instrument panel function unit.

The invention claimed is:

1. An information processing and display device for a vehicle, comprising:
   a display device;
   an input unit that receives a user operation; and
   a processor that performs processing for a plurality of functions in accordance with a program stored in a storage unit;
   wherein the processor:
   sets a priority to each of a plurality of divided regions on the display device,
   generates display data for displaying information to be displayed related to the plurality of functions divided into the plurality of divided regions on the display device,
   changes a size of at least one of the plurality of divided regions, the size of the at least one divided region is automatically changed in response to a user operation to change the size,
   changes a priority to the at least one divided region based on the size of the at least one divided region, the priority is automatically changed in response to the change in size of the at least one divided region with the user operation, a higher priority is set to a divided region having a larger size, and
   prioritizes execution of processing that is related to a function for which information is displayed in the at least one divided region based on the priority of the at least one divided region, the execution of processing is automatically prioritized in response to the setting of priority to the at least one divided region based on the user operation, wherein execution of processing is prioritized to a divided region that is set to be the largest among the plurality of functions over other divided regions related to the other functions.

2. The information processing and display device according to claim 1, wherein the processor sets priority to each of the plurality of divided regions in order of size, and performs processing related to the plurality of functions in accordance with the priority set to the divided region in which information related to the function is displayed.

3. The information processing and display device according to claim 1, wherein the processor sets an information update frequency that is related to the function for which information is displayed in the divided region that is set to be the largest among the plurality of functions to be higher than information update frequencies that are related to the other functions.

4. The information processing and display device according to claim 1, wherein the processor comprises a central processing unit (CPU) and executes a program that increases a processing share of processing related to, among the plurality of functions, the function that is displaying information in the divided region that is set as the largest over processing related to other functions.

5. The information processing and display device according to claim 1, wherein the information processing and display device is installed in a vehicle, the plurality of functions includes at least one of a navigation function, a contents provider function, and an instrument panel function, and the user operation is an operation of changing a size of the divided regions to be allocated to the plurality of functions.

6. An information processing and display device for a vehicle, comprising:
   a display device;
   an input unit that receives a user operation; and
   a processor that performs processing for a plurality of functions in accordance with a program stored in a storage unit;
   wherein the processor:
   sets a priority to each of a plurality of divided regions on the display device, a demarcation of the plurality of divided regions can be changed so that a size of at least one of the plurality of divided regions is based on a user operation,
   generates display data for displaying information to be displayed related to the plurality of functions divided into the plurality of divided regions on the display device,
   changes a priority to the at least one divided region based on the size of the at least one divided region, the priority is automatically changed in response to the change in size of the at least one divided region with the user operation, a higher priority is set to a divided region having a larger size, and
   prioritizes execution of processing that is related to a function for which information is displayed in the at least one divided region based on the priority of the at least one divided region, the execution of processing is automatically prioritized in response to the setting of priority to the at least one divided region based on the user operation, wherein execution of processing is prioritized to a divided region that is set to be the largest among the plurality of functions over other divided regions related to the other functions,
   wherein the information processing and display device is installed in a vehicle, the plurality of functions include a function of acquiring and displaying images in a plurality of directions surrounding the vehicle, and the processor allocates the plurality of divided regions to the plurality of directions, enlarges a corresponding divided region when a user operation for requesting enlargement of the divided region in any of the plurality of directions is received, and prioritizes processing related to display in this divided region over processing related to display in other divided regions.

7. An information processing and display method for displaying information related to a plurality of functions separately in a plurality of divided regions on a display device for a vehicle, comprising the steps of:
   setting a priority to each of a plurality of divided regions on the display device;
   generating display data for displaying information to be displayed related to the plurality of functions divided into the plurality of divided regions on the display device;
   changing a priority to at least one divided region based on a size of the at least one divided region, the priority is automatically changed in response to the change in size of the at least one divided region with a user operation, a higher priority is set to a divided region having a larger size;
   prioritizing execution of a process for generating display data related to the at least one divided region to which a higher priority is set over a process of generating display data related to a divided region to which a lower priority is set, the execution of processing is automatically prioritized in response to the setting of priority to the at least one divided region based on the user operation; and
   displaying the generated various sets of display data in the corresponding divided region;
   wherein, when a boundary between the plurality of divided regions is changed by the user operation, the setting of the priority is changed in accordance with the sizes of the plurality of divided regions at that time.

8. The information processing and display method according to claim 7, wherein an update frequency of the display data related to the divided region to which the higher priority is set is higher than an update frequency of the display data related to the divided region to which the lower priority is set.

9. The information processing and display method according to claim 7, wherein processing for generating display data is executed by a central processing unit (CPU), and a higher processing share is allocated to processing for generating display data related to a divided region that is set to a higher priority than to processing for generating display data related to display data for a divided region that is set to a lower priority.

10. The information processing and display method according to claim 7, wherein the information related to the plurality of functions is displayed on the display device mounted on a vehicle, the plurality of functions includes at least one of a navigation function, a contents provider function, and an instrument panel function, and the user operation is an operation of changing the sizes of the divided regions allocated to the plurality of functions.

11. The information processing and display method according to claim 7, wherein the information related to the plurality of functions is displayed on the display device mounted on a vehicle, at least a part of the plurality of functions is a function of acquiring and displaying images in a plurality of directions surrounding the vehicle, and the plurality of divided regions are respectively allocated to the plurality of directions.

\* \* \* \* \*